(12) United States Patent
Yakovlev (10) Patent No.: US 9,384,353 B2
(45) Date of Patent: *Jul. 5, 2016

(54) SYSTEM AND METHOD FOR ENCRYPTION OF DISK BASED ON PRE-BOOT COMPATIBILITY TESTING

(71) Applicant: Kaspersky Lab ZAO, Moscow (RU)

(72) Inventor: Evgeny A. Yakovlev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 159 days.

This patent is subject to a terminal disclaimer.

(21) Appl. No.: 14/657,005

(22) Filed: Mar. 13, 2015

(65) Prior Publication Data

US 2015/0347757 A1    Dec. 3, 2015

Related U.S. Application Data

(63) Continuation of application No. 14/294,311, filed on Jun. 3, 2014, now Pat. No. 9,003,176.

(51) Int. Cl.
*G06F 15/177* (2006.01)
*G06F 21/57* (2013.01)
(Continued)

(52) U.S. Cl.
CPC .......... *G06F 21/575* (2013.01); *G06F 11/1417* (2013.01); *G06F 21/78* (2013.01); *G06F 2221/2107* (2013.01)

(58) Field of Classification Search
CPC ...... G06F 21/57; G06F 21/575; G06F 21/602
USPC ........................................................ 713/1, 2
See application file for complete search history.

(56) References Cited

U.S. PATENT DOCUMENTS 6,889,340 B1    5/2005  Bramley
8,171,272 B1    5/2012  Chester et al.
8,533,830 B1    9/2013  Dalcher
(Continued)

OTHER PUBLICATIONS

McAfee: "McAfee Endpoint Encryption 7.0 for use with ePolicy Orchestrator 4.6 Software, Product Guide",9 Jan. 1, 2012, XP055194389, Retrieved from the Internet: URL:https://kc.mcafee.com/resources/sites/MCAFEE/content/live/PRODUCT_DOCUMENTATION/ 24000/PD24140/en US/Endpoint Encryption 7 0 ProductGuide.5df [retrieved on Jun. 9, 2015]pp. 10,15,16 pp. 26,27,59.

(Continued)

*Primary Examiner* — Vincent Tran
(74) *Attorney, Agent, or Firm* — Arent Fox LLP; Michael Fainberg (57) ABSTRACT

Disclosed are systems, methods and computer program products for encryption of disk based on pre-boot compatibility testing. An example method includes upon determining, by a processor, no test booting of the computer, performing one or more pre-boot compatibility tests to boot an operating system of the computer; upon detecting a successful test booting, performing booting the operating system of the computer or performing the one or more pre-boot compatibility tests again; upon detecting an unsuccessful test booting, restoring a process of ordinary booting of the operating system and performing an ordinary booting of the operating system; determining one or more encryption policies applicable to a pre-boot execution stage of the computer; and comparing results of the one or more pre-boot compatibility tests with the encryption policies to determine whether to apply a full disk encryption to the boot disk.

20 Claims, 4 Drawing Sheets

(51) Int. Cl.
*G06F 11/14* (2006.01)
*G06F 21/78* (2013.01)

(56) References Cited

U.S. PATENT DOCUMENTS

| | | |
|---|---|---|
| 8,588,422 B2 | 11/2013 | Beachem et al. |
| 9,003,176 B1* | 4/2015 | Yakovlev ............ 713/2 |
| 2011/0246773 A1 | 10/2011 | Sidle et al. |
| 2012/0008771 A1* | 1/2012 | Lu et al. ............ 380/46 |
| 2012/0151200 A1 | 6/2012 | Beachem et al. |
| 2012/0151223 A1* | 6/2012 | Conde Marques et al. ... 713/193 |
| 2012/0254602 A1 | 10/2012 | Bhansali et al. |
| 2013/0067210 A1 | 3/2013 | Nelson et al. |
| 2013/0173900 A1 | 7/2013 | Liu |
| 2014/0181494 A1 | 6/2014 | Kayama |

OTHER PUBLICATIONS

Best Practice Guide "McAfee Endpoint Encryption 7.0 Software" Copyright 2012 McAfee, Inc.
Best Pratices: PGP whole disk encryption for Windows (PGP WDE). TECH149216, Oct. 22, 2008, Symantec Corporation.

* cited by examiner

SYSTEM AND METHOD FOR ENCRYPTION
OF DISK BASED ON PRE-BOOT
COMPATIBILITY TESTING

CROSS-REFERENCE TO RELATED APPLICATIONS

This application is a continuation of U.S. patent application Ser. No. 14/294,311 filed on Jun. 3, 2014, which is incorporated by reference herein.

TECHNICAL FIELD

The present disclosure relates generally to the field of information security, and more specifically, to systems and methods for encryption of disk based on pre-boot compatibility testing.

BACKGROUND

Modern operating systems utilize a system of user accounts and passwords to limit access to data on a computer. This can be effective if a hacker has temporary access to the computer, but the user accounts and passwords do not protect data if the computer is stolen. For example, there are ways (e.g., connecting the hard disk to another computer or starting it on a computer of a different operating system from an external storage medium) which allow one to read data from a disk. Even files that are removed can be restored by using software and hardware.

The threat of data loss in the event of theft or removal can be reduced by encryption of the data on the disk. This measure is important for mobile computers (notebooks, tablets) where the risk of getting lost or stolen is greatest, but it can be useful for providing security and confidentiality of data being kept on any computer or workstation.

Full Disk Encryption (FDE) is designed to protect data stored on a disk in cases when the computer is stolen or removed in the turned-off state.

File encryption is an encryption used only for particular files on a computer disk. It is easier and faster to use, but more vulnerable. For example, files in encrypted form can be copied and decrypted afterwards by the method of brute force. Also, programs which use encrypted files can save the decrypted files in a cache, and the original file after encryption is deleted from the disk, but it can be restored by restoring deleted files.

Passwords for hard disks are a function provided by the disk vendors. Disk passwords do not encrypt the data on the hard disk, they simply prevent the disk from interacting with the computer until the password is entered. There are ways of removing the passwords from disks, and also ways of extracting data with the aid of mechanical interventions in the hard disks (replacement of plates or microcircuits of the read only memory (ROM)).

If the computer is mobile and includes a substantial amount of important documents or any documents which can be classified as especially secret, it may be desired to use full disk encryption. Ever more threats are also appearing at present to corporate networks, within which data are present on almost every computer that should never under any circumstances leave the precincts of the corporate network.

There are many conventional ways of full disk encryption available, for example, by the specialized software products BitLocker, TrueCrypt, PGPDisk, and others. Also, recently, a way of performing full disk encryption has become part of popular antivirus corporate solutions, such as Kaspersky Endpoint Security DPE.

When carrying out a full disk encryption of boot disks, a pre-boot authentication module is installed on the disk. This module asks the user to enter a password, and after this is entered correctly the booting of the operating system (OS) begins.

Antivirus software products also have their own pre-boot authentication modules. When a full disk encryption is applied to the boot disk, the antivirus software changes the sequence of the booting process, integrating the pre-boot authentication module in the conventional process of pre-booting of the computer. This module operates at the pre-booting execution stage and uses the interfaces of the basic input/output system (BIOS) or a unified extensible firmware interface (UEFI) to work with the computer hardware. The pre-booting execution stage is the stage in which the microcode of the computer is initialized, but the booting of the operating system (OS) has not yet begun.

In the pre-booting execution stage, interaction with the computer hardware is possible only via the microcode interfaces. The microcode has its own issues, limitations and problems involving the hardware compatibility of devices. Therefore, the components of the antivirus software working at this stage can also have various compatibility problems. When such problems occur, the computer may not start, since the pre-boot authentication module is used for starting up the OS from an encrypted disk, but is not compatible with the computer hardware.

SUMMARY

Disclosed are systems, methods and computer program products for encryption of disk based on pre-boot compatibility testing. An example method includes upon determining, by a processor, no test booting of the computer, performing one or more pre-boot compatibility tests to boot an operating system of the computer; upon detecting a successful test booting, performing booting the operating system of the computer or performing the one or more pre-boot compatibility tests again; upon detecting an unsuccessful test booting, restoring a process of ordinary booting of the operating system and performing an ordinary booting of the operating system; determining one or more encryption policies applicable to a pre-boot execution stage of the computer; and comparing results of the one or more pre-boot compatibility tests with the encryption policies to determine whether to apply a full disk encryption to the boot disk.

In one example aspect, the method further includes prior to performing the one or more pre-boot compatibility tests, changing a booting process of the computer to enable the one or more pre-boot compatibility tests; and rebooting the computer.

In one example aspect, the method further includes upon determining to apply the full disk encryption: detecting that the full disk encryption cannot be performed on the computer, wherein the computer is part of a corporate network; and alerting a network administrator of the corporate network that the full disk encryption cannot be performed.

In one example aspect, the method further includes comparing the encryption policies with the pre-boot compatibility tests after starting the operating system of the computer.

In one example aspect, the method further includes the encryption policies with the one or more pre-boot compatibility tests by one or more of: the computer, a network security server, and a pre-boot agent.

In one example aspect, the method further includes performing the one or more pre-boot compatibility tests on demand and without following by the full disk encryption.

In one example aspect, the method further includes using a flag to indicate a status of the test booting.

In another example aspect, a system of full disk encryption of a boot disk of a computer comprises a processor configured to: upon determine, by a processor, no test booting of the computer, performing one or more pre-boot compatibility tests to boot an operating system of the computer; upon detecting a successful test booting, perform booting the operating system of the computer or perform the one or more pre-boot compatibility tests again; upon detecting an unsuccessful test booting, restore a process of ordinary booting of the operating system and perform an ordinary booting of the operating system; determine one or more encryption policies applicable to a pre-boot execution stage of the computer; and compare results of the one or more pre-boot compatibility tests with the encryption policies to determine whether to apply a full disk encryption to the boot disk.

In another example aspect, a computer program product stored on a non-transitory computer-readable storage medium, the computer program product comprising computer-executable instructions for full disk encryption of a boot disk of a computer, including instructions for: upon determining no test booting of the computer, performing one or more pre-boot compatibility tests to boot an operating system of the computer; upon detecting a successful test booting, performing booting the operating system of the computer or performing the one or more pre-boot compatibility tests again; upon detecting an unsuccessful test booting, restoring a process of ordinary booting of the operating system and performing an ordinary booting of the operating system; determining one or more encryption policies applicable to a pre-boot execution stage of the computer; and comparing results of the one or more pre-boot compatibility tests with the encryption policies to determine whether to apply a full disk encryption to the boot disk.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method, and computer program product for full disk encryption of a boot disk. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Some present aspects provide a pre-boot compatibility check that reduces the risks associated with possible inoperability of the computer after performing the full disk encryption. For example, some present aspects perform testing of known causes of incompatibility before the boot disk has been encrypted. The starting of the check can also be initiated by the system administrator for an individual computer.

The implementation of the present aspects may make use of both BIOS and UEFI interfaces. The computer-booting process may be altered both for disks using a master boot record (MBR) and for disks using a partition table with a global unique identifier (GPT or GUID partition table).

Some implementations of the present aspects may operate during the pre-boot execution, and therefore a minimum of one rebooting of the computer may be necessary in the testing process.

Figure 1:
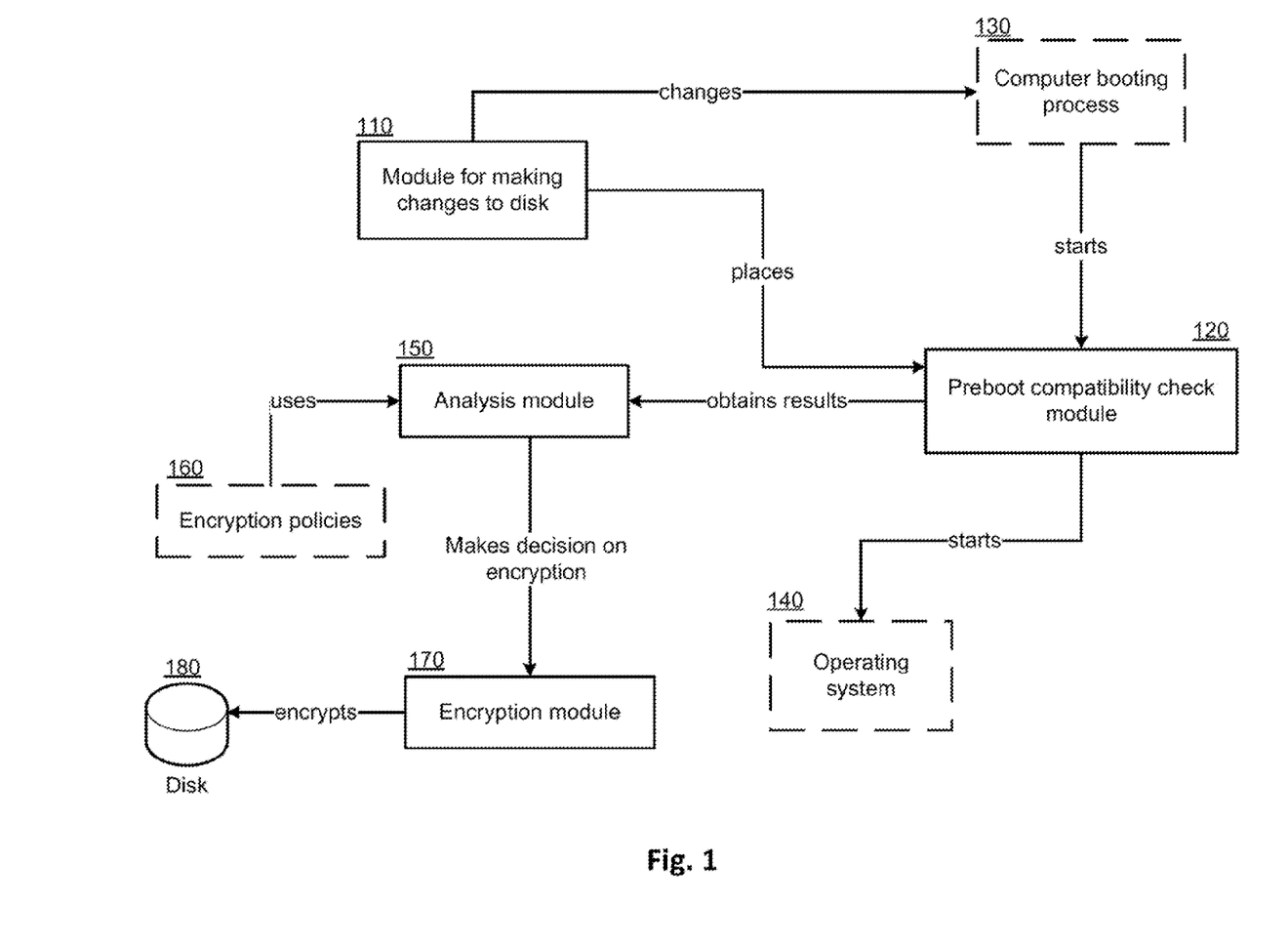
FIG. 1 shows an example system for performing a full disk encryption of a disk with a pre-boot compatibility check.

FIG. 1 illustrates an example system for performing a full disk encryption of a disk with a pre-boot compatibility check.

This example system includes:

A module for making changes to the disk 110:
prepares the boot disk, placing the pre-boot compatibility check module 120 thereon;
changes the booting process of the computer 130 to enable the starting of the pre-boot compatibility check module 120;
performs the rebooting of the computer.

A pre-boot compatibility check module 120:
performs pre-boot compatibility tests;
makes an analysis of the encryption policies at the pre-boot execution stage;
performs the booting of the OS 140.

An analysis module 150:
receives the results of the testing from the pre-boot compatibility check module 120;
utilizes the encryption policies 160;
compares the results of the testing with the encryption policies;
makes a decision as to the possibility of applying the full disk encryption.

An encryption module 170:
receives the decision as to the possibility of applying the full disk encryption from the analysis module 150;
performs the encryption of the boot disk 180.

If in some example aspects the full disk encryption cannot be performed on a computer that is part of the corporate network, the encryption module 170 may alert the network administrator as to the impossibility of applying the encryption policy on the given computer.

If in some aspects the software and hardware configuration of the computer of the corporate network is changed, the administrator may again try to apply the encryption policy.

Figure 2:
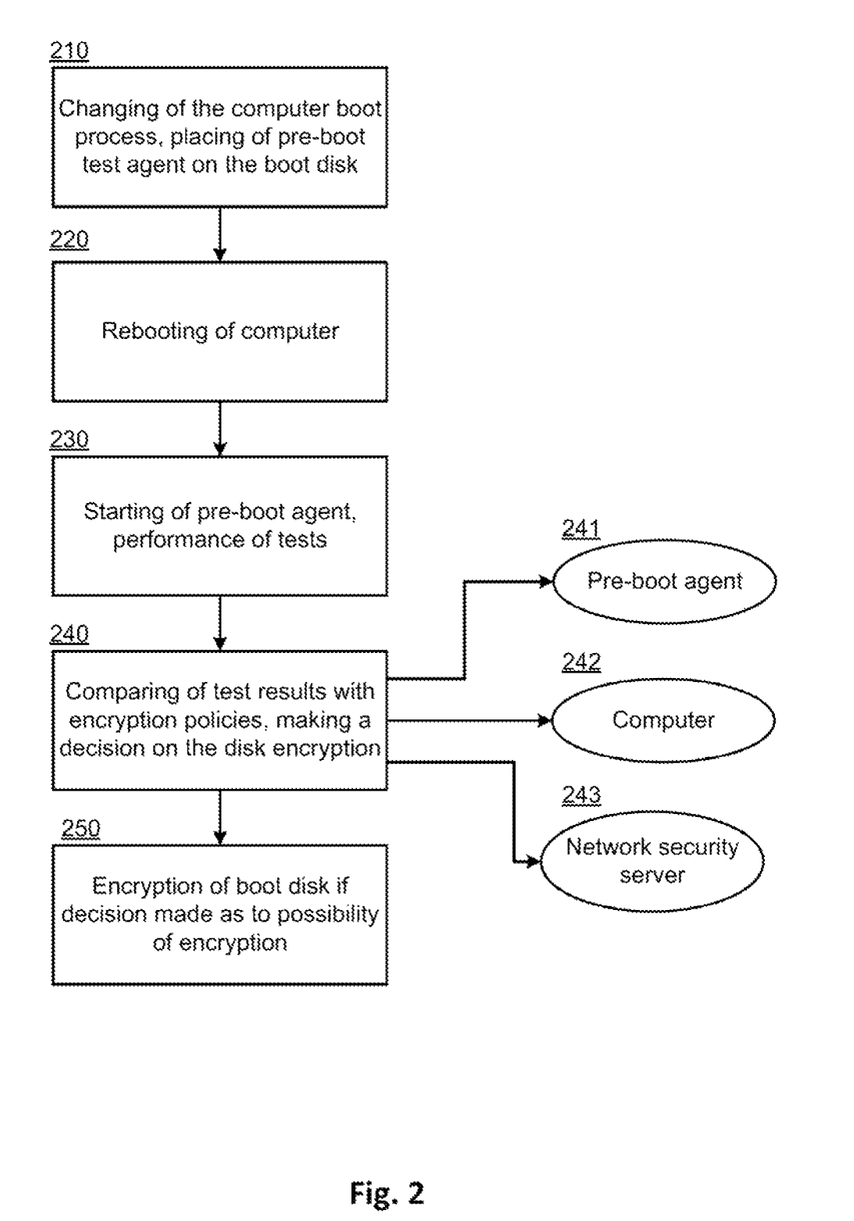
FIG. 2 is a flowchart of an example process of encrypting a boot disk.

FIG. 2 is a flowchart of an example process of encryption of a boot disk according to some present aspects. In the initial stage 210 the pre-boot compatibility check module 120 is placed on the disk, and the booting process of the computer is altered to enable the starting of the pre-boot compatibility check module 120. After this there is a rebooting of the computer 220. The pre-boot compatibility check module 120 performs the necessary tests 230. From the results of the testing and after comparing them to the encryption policies, a decision is made as to the possibility of encrypting the boot disk 240. In some aspects, the encryption policies may be compared with the results of the testing both in the pre-boot execution stage 241 and after the starting of the operating system 242, and also by the network security server 243. If an affirmative decision is made as to the possibility of encryption, the full disk encryption of the boot disk 250 is carried out.

The encryption policies may contain the following criteria with regard to the boot disk:
- the size of the disk, for example, full disk encryption has been conventionally employed for large disks;
- the number of logical partitions on the disk;
- does the disk layout include an MBR or not;
- does the disk layout include a GPT or not;
- the condition of the disk from self-diagnostic results, for example, if the disk SMART contains warnings, the disk may be damaged during the encryption;
- the type of medium: HDD (hard disk drive), SDD (solid state drive) or other, for example, the lifetime of solid state memory is reduced by using full disk encryption;
- is the disk a RAID array;
- the operating system is on a single disk;
- no need to reboot the computer to install drivers or updates;
- a system partition file system;
- presence of errors on the logic disk;
- the amount of free space on the disk;
- presence of shared network folders on the disk;
- the disk is write-protected;
- the network segment in which the computer is located;
- the computer users;
- the type of computer: notebook, workstation, server.

Figure 3:
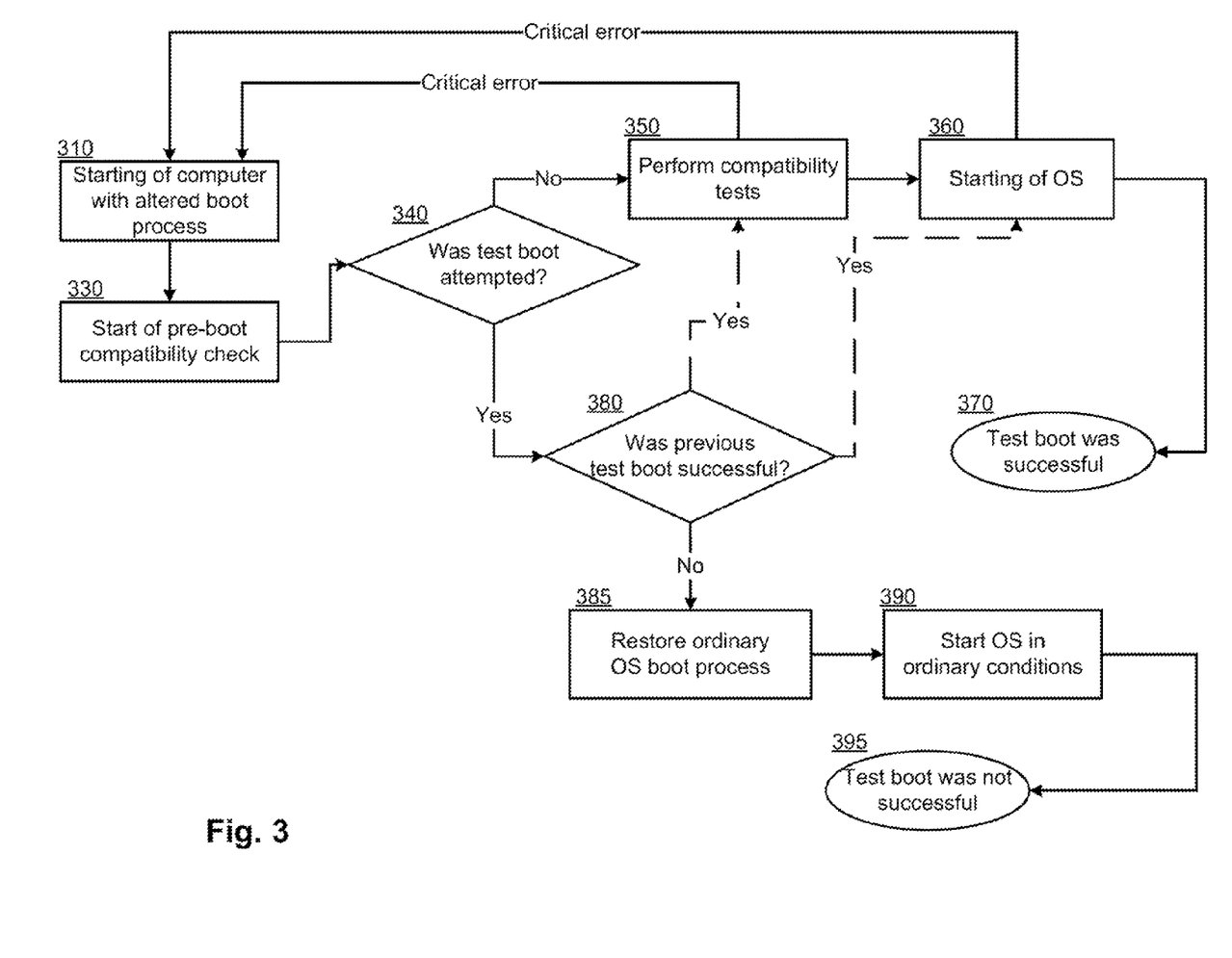
FIG. 3 is a flowchart of an example check algorithm performed by the pre-boot compatibility check module.

Implementation of some present aspects may require the performance of necessary pre-boot tests by the pre-boot compatibility check module 120 and providing access to the results of these tests to the analysis module 150. In these aspects, it may also be necessary to provide the option of performing both a mandatory check before the encryption is performed and an arbitrary check on demand (for example, of the network administrator) without performing the encryption.

Since the pre-boot compatibility check module 120 works at the stage of pre-boot execution and may be incompatible with the computer hardware, conditions may arise when the computer cannot perform a booting. In cases of such incompatibility, an automatic decision to restore the computer to a working state and the option of automatic return of the process of booting the operating system to the initial state may be necessary. In these aspects, support may also be needed for an external restoration utility if the normal process of booting the operating system cannot be automatically restored by the pre-boot compatibility check module 120.

FIG. 3 is a flowchart of an example check algorithm performed by the pre-boot compatibility check module 120. In the initial stage 310, the computer with an altered booting process starts the pre-boot compatibility check 330 by starting the pre-boot compatibility check module 120. Then a check is made as to whether test booting has been performed 340 (e.g., is the test boot flag set or not). If it has not been performed, the test boot flag is set, the successful boot flag is reset (regardless of its current state), and the compatibility tests are performed 350. After performing the tests, an attempt is made to boot the OS 360. If there is a successful booting of the computer by the encryption module 170, the successful boot flag is set 370. If a test boot was performed previously (e.g., the test boot flag has been set), the pre-boot compatibility check module 120 checks the successful boot flag in step 380. If it has been set, the pre-boot compatibility check module 120 in one possible example aspect performs the booting of the OS 360; in another example aspect it again performs the tests of step 350. If the booting was not successful (e.g., the successful boot flag was not set), it is considered to have failed, and the restoration of the processes of booting the OS 385 and booting the OS in ordinary conditions 390 is performed. In this case, the encryption module 170 determines the conditions in which the booting of the OS occurred and does not set the successful boot flag 395.

Figure 4:
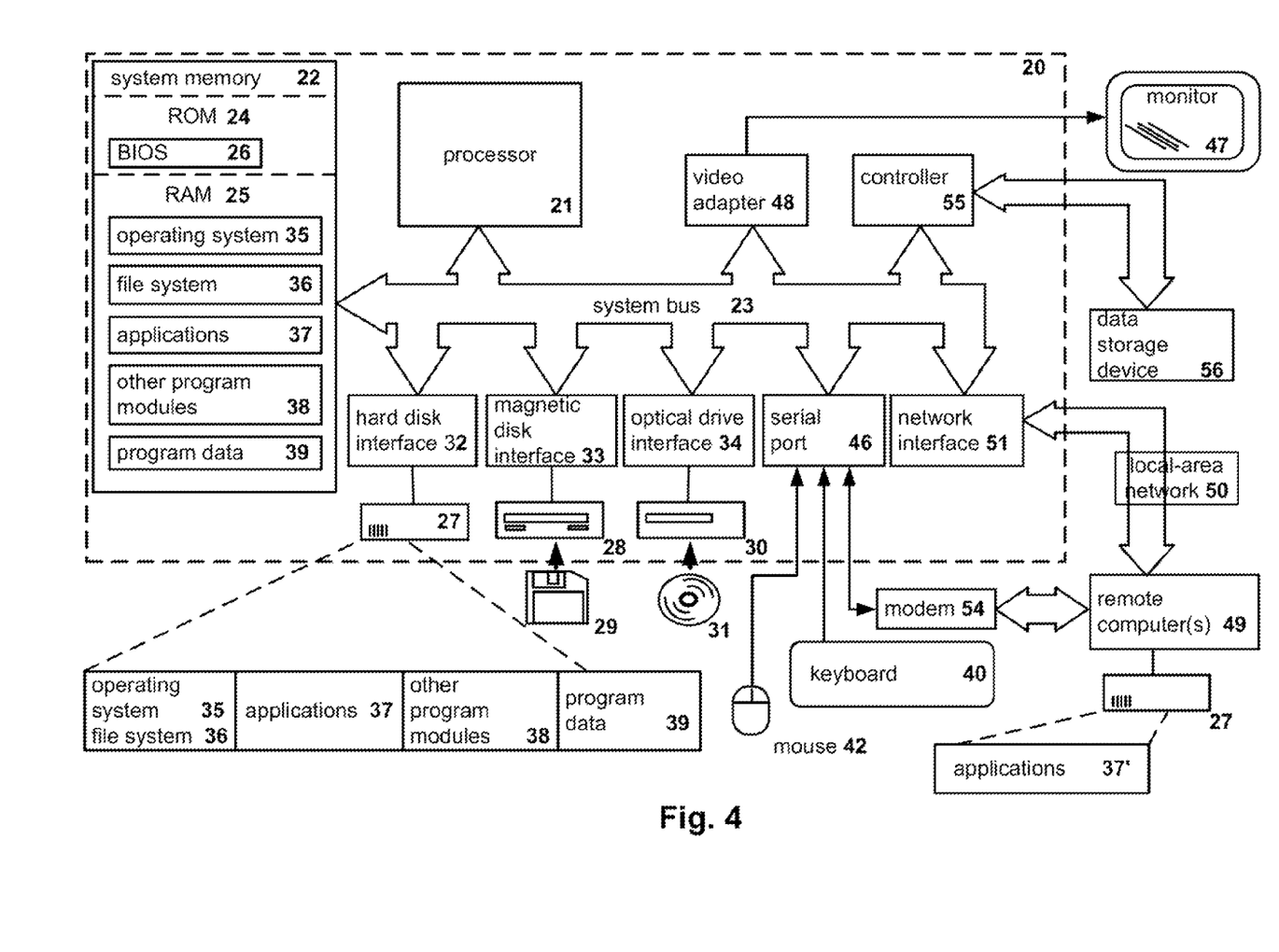
FIG. 4 shows an example of a general-purpose computer system on which the present aspects may be implemented.

FIG. 4 shows an example of a general-purpose computer system (which may be a personal computer or a server) 20, including a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to work in a network environment, using a network connection to one or more remote computers 49. The remote computer (or computers) 49 are also personal computers or servers having the majority or all of the aforementioned elements in describing the nature of a personal computer 20, as shown in FIG. 4. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 6 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method of full disk encryption of a boot disk of a computer, comprising:
    upon determining, by a processor, no test booting of the computer, performing one or more pre-boot compatibility tests to boot an operating system of the computer;
    upon detecting a successful test booting, performing booting the operating system of the computer or performing the one or more pre-boot compatibility tests again;
    upon detecting an unsuccessful test booting, restoring a process of ordinary booting of the operating system and performing an ordinary booting of the operating system;
    determining one or more encryption policies applicable to a pre-boot execution stage of the computer; and
    comparing results of the one or more pre-boot compatibility tests with the encryption policies to determine whether to apply a full disk encryption to the boot disk.

2. The method of claim 1, further comprising:
    prior to performing the one or more pre-boot compatibility tests, changing a booting process of the computer to enable the one or more pre-boot compatibility tests; and
    rebooting the computer.

3. The method of claim 1, further comprising:
    upon determining to apply the full disk encryption:
        detecting that the full disk encryption cannot be performed on the computer, wherein the computer is part of a corporate network; and
        alerting a network administrator of the corporate network that the full disk encryption cannot be performed.

4. The method of claim 1, further comprising comparing the encryption policies with the pre-boot compatibility tests after starting the operating system of the computer.

5. The method of claim 1, further comprising the encryption policies with the one or more pre-boot compatibility tests by one or more of: the computer, a network security server, and a pre-boot agent.

6. The method of claim 1, further comprising performing the one or more pre-boot compatibility tests on demand and without following by the full disk encryption.

7. The method of claim 1, further comprising using a flag to indicate a status of the test booting.

8. A system of full disk encryption of a boot disk of a computer, comprising:
    a processor configured to:

upon determine, by a processor, no test booting of the computer, performing one or more pre-boot compatibility tests to boot an operating system of the computer;

upon detecting a successful test booting, perform booting the operating system of the computer or perform the one or more pre-boot compatibility tests again;

upon detecting an unsuccessful test booting, restore a process of ordinary booting of the operating system and perform an ordinary booting of the operating system;

determine one or more encryption policies applicable to a pre-boot execution stage of the computer; and compare results of the one or more pre-boot compatibility tests with the encryption policies to determine whether to apply a full disk encryption to the boot disk.

9. The system of claim 8, wherein the processor is further configured to:

prior to performing the one or more pre-boot compatibility tests, change a booting process of the computer to enable the one or more pre-boot compatibility tests; and reboot the computer.

10. The system of claim 8, wherein, upon determining to apply the full disk encryption, the processor is further configured to:

determine that the full disk encryption cannot be performed on the computer, wherein the computer is part of a corporate network; and alert a network administrator of the corporate network that the full disk encryption cannot be performed.

11. The system of claim 8, wherein the processor is further configured to compare the encryption policies with the one or more pre-boot compatibility tests after starting the operating system of the computer.

12. The system of claim 8, wherein the processor is further configured to compare the encryption policies with the one or more pre-boot compatibility tests by one or more of: the computer, a network security server, and a pre-boot agent.

13. The system of claim 8, wherein the processor is further configured to perform the one or more pre-boot compatibility tests on demand and without following by the full disk encryption.

14. The system of claim 8, wherein the processor is further configured to use a flag to indicate a status of the test booting.

15. A computer program product stored on a non-transitory computer-readable storage medium, the computer program product comprising computer-executable instructions for full disk encryption of a boot disk of a computer, including instructions for:

upon determining no test booting of the computer, performing one or more pre-boot compatibility tests to boot an operating system of the computer;

upon detecting a successful test booting, performing booting the operating system of the computer or performing the one or more pre-boot compatibility tests again;

upon detecting an unsuccessful test booting, restoring a process of ordinary booting of the operating system and performing an ordinary booting of the operating system;

determining one or more encryption policies applicable to a pre-boot execution stage of the computer; and comparing results of the one or more pre-boot compatibility tests with the encryption policies to determine whether to apply a full disk encryption to the boot disk.

16. The computer program product of claim 15, further comprising instructions for:

prior to performing the one or more pre-boot compatibility tests, changing a booting process of the computer to enable the one or more pre-boot compatibility tests; and rebooting the computer.

17. The computer program product of claim 15, further comprising instructions for:

upon determining to apply the full disk encryption:

determining that the full disk encryption cannot be performed on the computer, wherein the computer is part of a corporate network; and alerting a network administrator of the corporate network that the full disk encryption cannot be performed.

18. The computer program product of claim 15, further comprising instructions for comparing encryption policies with the one or more pre-boot compatibility tests after starting the operating system of the computer by one or more of: the computer, a network security server, and a pre-boot agent.

19. The computer program product of claim 15, further comprising instructions for performing the one or more pre-boot compatibility tests on demand and without following by the full disk encryption.

20. The computer program product of claim 15, further comprising instructions for using a flag to indicate a status of the test booting.

* * * * *